April 13, 1937. R. O. CHAFFEE 2,077,355
PLUG BUTTON
Filed Dec. 12, 1933
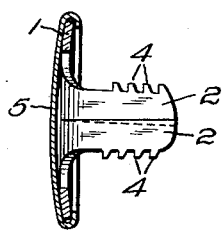
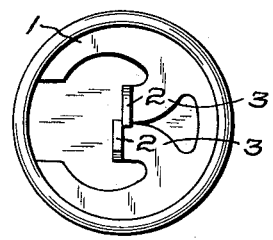
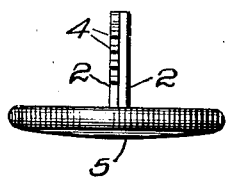
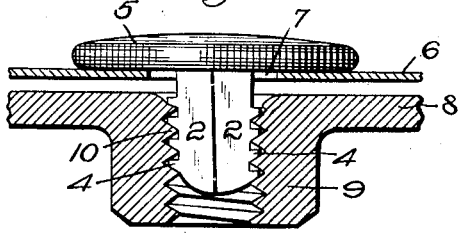
Inventor:
Raymond O. Chaffee,
by Walter J. Jones
Atty.

Patented Apr. 13, 1937

2,077,355

UNITED STATES PATENT OFFICE 2,077,355

PLUG BUTTON

Raymond O. Chaffee, Belmont, Mass., assignor to United-Carr Fastener Corporation, Cambridge, Mass., a corporation of Massachusetts Application December 12, 1933, Serial No. 702,002

2 Claims. (Cl. 85—5)

My invention aims to provide improvements in plug buttons.

In the drawing which illustrates a preferred embodiment of my invention:—

Figure 1 is a vertical section through my improved plug button;

Fig. 2 is a rear view of the button;

Fig. 3 is a side elevation of the button; and

Fig. 4 is a view of the button and parts of an installation, the button being shown in elevation and the other parts being shown in cross-section.

Referring to the particular embodiment of my invention illustrated, I have shown a so-called plug button particularly, though not exclusively, useful in connection with covering a hole in an installation with which is used a nut structure.

The plug button illustrated has a fastener member provided with a base 1 (Fig. 2), a pair of arms 2—2 extending upwardly from approximately the center of the base and connected to the base by connecting portions 3—3. The fastener member is preferably formed from sheet metal and the entire device is stamped from a single blank from which the arms are bent upwardly to substantially a right angle with relation to the plane of the base portion 1. The arms 2—2 are preferably arranged in offset planes so that they may move toward and away from each other edgewise and pass by each other somewhat like the arms of a scissors. The connecting portions 3—3 are independent of each other, as clearly illustrated in Fig. 2, and each carries an arm 2 so that the arms may move toward and away from each other due to the flexibility of the cut-out base 1 and the connecting portions 3—3. The outer edge of each arm 2 is provided with a series of teeth 4, the purposes of which will be more fully hereinafter described. It will also be noticed that I prefer to have the teeth on one side staggered with relation to the teeth on the other arm. In order that the device may present a finished button-like appearance, I secure a sheet metal cap 5 to the base 1 so that the base is entirely concealed when the fastening device is viewed from one side of the base.

My improved plug button has been used quite extensively for concealing holes in the apron covering the gasoline tank at the rear of a motor vehicle through which access may be had to a nut structure with which is engaged a part of a tire carrier structure. With many motor vehicle manufacturers a standard construction is used on various types of body structures, but in some cases the tire carrier is omitted from the rear of the motor vehicle and therefore it is desirable to conceal the holes when not used. In Fig. 4 I have illustrated one type of structure with which my improved plug button has been used. This structure includes a thin sheet metal part 6 having an aperture 7 and a tire carrier supporting structure 8 having an internally threaded nut portion 9.

When it is desirable to use my improved plug button for closing the hole 7 in the installation shown in Fig. 4, it is merely necessary to enter the arms 2—2 through the aperture 7 and press on the cap 5 to force the teeth 4—4 into engagement with the thread 10. The teeth 4—4 are beveled on their forward edges so that they may readily pass over the thread 10 when the arms are pushed into the nut structure. The rear edges of the teeth 4—4 present relatively abrupt shoulders for engagement with the thread 10 (Fig. 4) so that the fastener cannot be removed by a straight pull. Thus, the plug button is held securely in position to conceal the aperture 7 and can be removed only by a rotating action the same as withdrawing a screw. Since the teeth 4 on one of the arms are staggered with relation to the teeth on the other arm, some or all of the teeth on each arm therefore interlock with the thread 10.

My improved plug button is simple in construction, durable, easy to use and relatively inexpensive. It is particularly useful where it is desirable to cover unsightly holes, while at the same time it may be readily removed to permit access to the hole and underlying parts.

While I have illustrated and described a preferred embodiment of my invention, I do not wish to be limited thereby, because the scope of my invention is best defined by the following claims.

I claim:

1. A button of the class described having a base, a pair of arms movable toward and away from each other edgewise and arranged in offset parallel planes to permit scissors-like movement and teeth formed on the outermost edge of each arm, said teeth on one arm being staggered relative to the teeth on the other arm for engagement with a device having a conventionally threaded hole, and said teeth being beveled on their forward edges to permit ready insertion of said button in said threaded hole by a direct axial push, and said teeth having relatively abrupt shoulders on their rear edges whereby said button cannot be disengaged from said element except by a rotating action thereof.

2. A button of the class described having a base, a cap secured to said base, a pair of arms extending from said base and movable toward and away from each other edgewise, teeth formed on the outermost edge of each arm, said teeth on one arm being staggered relative to the teeth on the other arm for engagement with a device having a conventionally threaded hole, said teeth being beveled on their forward edges to permit ready insertion of said button in said threaded hole by a direct axial push, and said teeth having relatively abrupt shoulders on their rear edges to prevent removal of said button except by rotating action.

RAYMOND O. CHAFFEE.